Oct. 29, 1968  R. BERGSMA  3,408,506
HYDRAULIC-ELECTRIC TEMPERATURE CONTROL
Filed May 7, 1965  2 Sheets-Sheet 1

INVENTOR.
Rudolph Bergsma.
BY
Harness, Dickey & Pierce
ATTORNEYS.

Oct. 29, 1968  R. BERGSMA  3,408,506
HYDRAULIC-ELECTRIC TEMPERATURE CONTROL
Filed May 7, 1965  2 Sheets-Sheet 2

INVENTOR.
Rudolph Bergsma
BY
Carness, Dickey & Pierce
ATTORNEYS

United States Patent Office 3,408,506
Patented Oct. 29, 1968

3,408,506
HYDRAULIC-ELECTRIC TEMPERATURE
CONTROL
Rudolph Bergsma, Ann Arbor, Mich., assignor to King-Seeley Thermos Co., Ann Arbor, Mich., a corporation of Michigan
Filed May 7, 1965, Ser. No. 454,046
20 Claims. (Cl. 307—117)

ABSTRACT OF THE DISCLOSURE

A temperature controlling system in which a low-energy electrical system is modulatingly controlled by a hydraulic temperature senser.

---

This invention relates to switches and more particularly to hydraulic controlled electric switch assemblies which may be used in an application where one or two conditions are utilized to control the condition of the switch assembly.

By way of example, the invention will be described in conjunction with a domestic cooking appliance but it is to be understood that the switch assembly, constituting the invention, may be utilized in a variety of applications unrelated to the example environment, as for example, in controlling a variety of electrical systems in a variety of arts. Hydraulic temperature control systems for domestic appliances generally include means for maintaining the temperature of a mass or environment, for example, a utensil on a stove or in an oven cavity, a food mass in a utensil or oven or the air in an oven, at one of a plurality of preselected temperatures. It is desirable that such systems also include means to control the heat input to the utensil or oven cavity so as to gradually reduce the rate of heat input as the preselected temperature is approached so that such a temperature will be attained without substantial overshooting. It is also desirable that such hydraulic temperature control systems include means for controlling the temperature of the utensil or oven cavity by means of an external control independently of the hydraulic portion of such control systems. It is also desirable that such hydraulic temperature control systems include means for controlling the interior temperature of a mass, such as a roast, in heat transfer relationship within an environment such as an oven cavity by reducing the heat input into the oven cavity as the interior of the roast approaches a desired degree of doneness in order to prevent overcooking. The present invention contemplates providing for all of these modes of operation in an improved low voltage hydraulic temperature control system and includes further variations of modes of operations which will become apparent as the description proceeds.

The hydraulic temperature control system of one embodiment of the present invention includes hydraulic senser means for sensing the temperature of a mass, such as an object being heated, or an environment and hydraulic responder means operatively connected to the senser means for controlling a pair of electrical contacts which complete a circuit including a low power source and a low power output device, for example, a hot wire relay, a thermal relay or a solenoid valve which controls the energization of means for heating the object or environment whose temperature is being sensed by the hydraulic senser means.

The hydraulic temperature control system of another embodiment of the present invention includes senser means for sensing a mass or an environment being heated as described above and responder means operatively connected to the senser means for controlling the condition of a plurality of pairs of condition selecting electrical contacts, one contact of each of said pairs being positioned by an adjustable biasing means. The pairs of contacts are each electrically connected in individual parallel or series, low power circuits including a series connected circuit controller, such as the hot wire described above, a relay, valve or the like, and the circuit controller operates to control the heat supplied to the mass or environment. The circuit controller includes an external switching device, such as a clock switch, for controlling the condition selecting contacts and heating means may be included in controllig relation to the biasing means for preventing overshooting as the desired temperature is approached.

In accordance with certain concepts of the present invention, the pair of contacts which are controlled by the hydraulic responder means are also controlled by means of a pulsating thermal relay which is included in the low power circuit to anticipate a predetermined temperature at which the hydraulic responder means will control the operation of the pair of contacts to energize or deenergize the low power output device and thereby affect the heat input to the object or an environment whose temperature is being sensed by the hydraulic senser means.

In accordance with certain other concepts of the present invention, clock control means are included in the low power circuit to control the low power output device independently of the hydraulic portion of the control system.

In accordance with still other concepts of the one embodiment of the present invention, a non-linear coefficient of resistance senser in heat transfer relationship with an object, such as a roast in an oven environment, is electrically connected to a heater winding which is in heat transfer relationship with the pulsating thermal relay so that the pair of contacts can be controlled by variances in the roast temperature independently of the control of the hydraulic senser means.

In accordance with certain concepts of another embodiment of the present invention, the pairs of contacts which are controlled by the responder means are selectively connected to the circuit controller by a switching means for controlling the energization of the heating circuit at a plurality of selected temperatures. In this way, a plurality of temperatures may be preselected to be achieved in a timed sequence or stepping operation while utilizing a single temperature sensing means.

In accordance with certain other concepts of another embodiment of the present invention, a mechanical advantage is achieved between the senser means and the responder means through an adjustable mechanical linkage, the advantage being variable through adjustment of the mechanical linkage.

Accordingly, it is one object of the present invention to provide an improved control device.

It is another object of the present invention to provide an improved control device for controlling the temperature of a mass or environment at a plurality of preselected temperatures.

It is another object of the present invention to provide an improved control device for controlling the temperature of a mass or environment at a plurality of preselected temperatures according to a timed sequence of operation.

It is another object of the present invention to provide an improved control device for controlling the temperature of a mass or environment which utilizes a low power circuit to control a high power circuit.

It is still another object of the present invention to provide an improved single senser, control device for controlling the temperature of a mass or environment wherein the preselected temperature is anticipated to avoid overshooting.

It is still another object of the present invention to provide an improved control device for controlling the temperature of a mass or environment wherein the mechanical advantage achieved in the system is adjustable.

It is still another object of the present invention to provide an improved control device for controlling the temperature of a mass or environment wherein a single temperature senser is utilized to sense the controlled temperature.

It is still a further object of the present invention to provide an improved control device for controlling the temperature of a mass or environment which is inexpensive to manufacture and simple to install.

With the above, as well as other and in certain cases more detailed objects in view, preferred but illustrative embodiments of the invention are shown in the accompanying drawings which are diagrammatic views of temperature control systems embodying the principles of the present invention. In the drawings.

As disclosed in the drawings, the present system generally comprises hydraulic senser means 10 and a low power electroresponsive switch means 12 including an output device 14 which, in the illustrated arrangement, controls the energization of an electrical device 16, as for example, a surface heater on top of a stove or an electrical heater in an oven cavity which is connected in a high power circuit.

The hydraulic senser means 10 comprises a hydraulic senser 18 which may take various forms. For example, the senser 18 could be a thermostatic fluid bulb adapted to be responsive to the temperature of a cooking utensil resting on a heater on the top surface of a stove. Such a bulb is located centrally of such a heater and is urged upwardly against the bottom surface of a cooking utensil by any well known spring construction. In the illustrated arrangement the hydraulic senser 18 is an elongated tubular element which is adapted to be mounted in heat transfer relationship with an environment such as an oven cavity and contains a thermally expansible fluid 20 which expands in direct relation to the increase in environmental temperature.

The expansible fluid 20 communicates, through a conduit 22, with a hydraulic responder which may also take various forms. For example, it could be a Bourdon tube, bellows, diaphragm or other fluid actuator which expands as the expansible fluid is heated, supplying a relatively large movement per degree of temperature change in the controlled range. In the illustrated arrangement, the hydraulic responder is preferably a Bourdon tube 24 having one of its ends 26 fixedly secured to a support 28 and is in fluid communication with the conduit 22 and is connected to suitable fixed support means. The Bourdon tube 24 is preferred in the illustrated arrangement since such a hydraulic responder has a high motion for a given pressure which improves the control accuracy of the system. Accordingly, a freely movable end 30 of the Bourdon tube 24 will move to a relatively great degree in response to temperature variations in the environment of the hydraulic senser 18.

The freely movable end 30 of the Bourdon tube 24 is rigidly secured to one end of a U-shaped rigid connector element 32 which has its opposite end rigidly connected to an elongated arm 34 of current conducting material. The opposite end of the elongated arm 34 carries a contact 36 which coacts with a second contact 38 carried by a contact positioning means or pulsating thermal relay 40. Thus, the motion of the expanding fluid in the tube 22 is translated to end of member 34 thereby controlling the position of contact 36 in response to sensed temperature. The pulsating thermal relay 40 includes first and second, spaced polymetallic leg portions 42, 44 representatively illustrated as lying substantially in a common plane and extending in spaced parallelism with one another in that plane.

In the illustrated arrangement, the first leg portion 42 is substantially longer than the second leg portion 44 for reasons to be hereinafter explained. One end of the second leg portion 44 is connected to an adjustable bracket 46 which is supported on a shaft 48 rotatably mounted in suitable fixed support means 49. The other end of the second leg portion 44 is joined to one end of the first leg portion 42 by means of a generally L-shaped crosspiece 50. The upstanding flange 52 increases the stiffness of the crosspiece 50 to a point where it will not deflect to any significant degree in response to the mechanical or thermal forces to which the pulsating thermal relay 40 is subjected.

The other end of the first leg portion 42 is freely movable and carries the second contact 38 which is electrically as well as mechanically integral therewith. The second contact 38 is adjustable with respect to the first contact 36 by means of a manually adjustable knob 54 which connects to the shaft 48. When the knob 54 is manually adjusted the bracket 46 pivots to move the pulsating thermal relay 40 about the axis of the pivot 48 to adjust the relative relationship of the first and second contacts 36, 38. The knob 54 includes a suitable scale which is graduated in degrees for indicating a predetermined sensed temperature at which the hydraulic responder or Bourdon tube 24 will move the U-shaped rigid connector 32 and elongated arm 34 to separate the first and second contacts 36, 38. The range of temperatures is normally in the cooking range but may be of a higher and lower scale.

It is often desirable to have snap make-and-break contact between the contacts 36, 38. In the illustrated arrangement, such snap action is provided by means of a permanent magnet 58 which has pole pieces on either side of the contact 38 and a ferrous armature 60 mounted on the contact carrying end of the arm 34 in alignment with the pole pieces of the permanent magnet 58. The magnetic attraction between the permanent magnet 58 and the armature 60 will delay the opening until such time as the force builds up to overcome the attractive force between the magnet 58 and armature 60. Similarly, when the contacts are sufficiently close to each other, the magnet 58 will attract the armature 60 and prematurely close the contacts 36, 38. Thus, the arrangement produces the desired snap action at the contacts 36, 38 in a manner well known in the art and also provides a temperature spread between opening and closing of the contacts 36, 38.

In the illustrated embodiment of the present invention, the action of the hydraulic portion of the control system is modified by the electroresponsive control circuit 12 including the pulsating thermal relay 40. The source which supplies the electrical energy for the circuit 12 and the heater 16 may be, for example, the usual source of alternating current, such as is found in a home, and is representatively illustrated as a 3-wire source with a 115 volt potential existing between wires $L_1$ and $L_2$ (neutral wire) and with, for example, a 230 volt potential existing between the wires $L_1$ and $L_3$.

When a manual switch 62 in the wire $L_2$ is closed, current is supplied to the primary winding 64 of a step-down transformer 66 to produce a voltage potential across the secondary winding 68 and thus between leads 70, 80. The power rating of the transformer winding 68 may be of a low value due to the low power requirements of the control circuit. The lead 70 is connected to the pulsating thermal circuit 40 through means including the elongated arm 34 and contacts 36, 38. The thermal relay 40 is electrically connected to a conductor 72 which in turn is connected through the contacts 74, 76 of a clock control 78, to one side of the low power output device 14. The other side of the output device 14 is connected to lead 80 of the secondary winding 68 by means of a conductor 82.

In the illustrated arrangement, the output device 14 is representatively disclosed as a hot wire relay including a wire 84 having a high temperature coefficient of expansion anchored at each end and electrically connected to the conductors 72, 82. The wire 84, when cool, exerts a force upon a cantilever spring 86 carrying a first electrical contact 88 which coacts with a second electrical contact 90 to complete the high energy circuit to energize the electrical heater 16. To initiate heating of an oven cavity or the like the knob 54 is adjusted to set a predetermined temperature at which the hydraulic senser 18 and Bourdon tube 24 will coact to open the contacts 36, 38. When the senser 18 and the pulsating thermal relay 40 are cold, the contacts 36, 38 will be closed.

Then the manual switch 62 is closed and the clock contacts 74, 76 are closed by setting the clock to a predetermined start and stop time or otherwise initiating a cooking cycle so that current will pass through the circuit defined by the lead 70 from the secondary winding 68, element 34, contacts 36, 38, thermal relay 40, conductor 72, clock contacts 74, 76, high temperature coefficient wire 84 of the hot wire relay and the conductor 82 back to the other lead 80 from the secondary winding 68. Accordingly, the high temperature coefficient wire 84 will expand causing the contacts 88, 90 to close to in turn energize the electrical heater 16 and raise the temperature of the oven cavity. When the hydraulic senser 18 is heated to the predetermined temperature, which may slightly differ from the mass or environment temperature set on the knob 54, the freely movable end 30 of the Bourdon tube 24 will have moved to an extent which will cause the U-shaped rigid connector element 32 and the elongated rigid arm 34 to separate the contacts 36, 38 and thereby interrupt the flow of current through the high temperature coefficient wire 84. The wire 84 will then contract to force the cantilever spring 86 in a direction to separate contacts 88, 90 and thereby interrupt the heat input into the oven cavity.

Once the heat input to the oven cavity has been interrupted the temperature therein will decrease below the set predetermined temperature. As the temperature of the hydraulic sensing element 18 decreases, the direction of movement of the freely movable end 30 the Bourdon tube reverses thereby causing the low energy contacts 36, 38 to reclose and complete the circuit through the low voltage output device 14. As the wire 84 reheats, the contacts 88, 90 are caused to reclose and reenergize the electrical heater 16 so as to maintain the oven cavity temperature at said predetermined temperature. It is to be remembered, however, that the opening and closing temperature of the contacts will be different due to the action of the snap make-and-break feature of the device. This is due to the inherent temperature spread characteristic of this feature.

In many cooking operations it is desirable to interrupt the heat input into the oven cavity in a preselected manner before the predetermined temperature is attained in order to avoid overshooting the predetermined set temperature. In the illustrated arrangement the predetermined temperature is anticipated by means of the self-heating characteristic of the bimetal utilized in the pulsating thermal relay 40. Without such anticipation and without the action of the snap-acting magnet, the low energy contacts 36, 38 will remain closed until the hydraulic temperature senser 18 reaches the predetermined temperature. In this case the reservoir of heat remaining in the electrical heater 16 will continue to raise the temperature of the oven cavity above the predetermined temperature even though the electrical heater 16 has been deenergized. It is through the self-heating of the unequal legs of the thermal relay 49 that the effect of the snap-acting device is under compensated, over compensated or fully compensated as is known in the art.

The desired anticipation of the predetermined temperature occurs in the following manner in the illustrated arrangement. When the contacts 36, 38 are closed, current passes through the first and second polymetallic leg portions 42, 44 of the thermal relay 40 causing the legs to self-heat for a predetermined period of time until the longer leg 42 deflects a sufficient distance to separate the second contact 38 from the first contact 36. The lengths of the polymetallic legs 42, 44 are so proportioned that this separation will occur before the hydraulic senser 18 is heated to the predetermined set temperature in the preferred embodiment. Accordingly, a control of the contacts 36, 38 is provided over and above the control provided in the hydraulic responder or Bourdon tube 24 as the temperature of the oven cavity is raised to the predetermined set temperature. During this period the first leg 42 will pulse according to the differential in length of the legs 42, 44 to open and close the contacts 36, 38 and thereby control the heating current to the wire 84. In effect, depending upon the thermal characteristics of the pulsating thermal relay 40 and as the hydraulic senser approaches the desired temperature, the contacts 36, 38 will be open more and more of the time thereby supplying less and less heat to the wire 84. Thus the oven cavity temperature will be gradually brought up to the predetermined temperature and the wire will start to cool and open the contacts 88, 90 prior to the attainment of that temperature through the action of the heating of bimetal 42, 44. Such an anticipation of the temperature of the oven cavity prevents the temperature thereof from overshooting the predetermined temperature set by the knob 54.

This anticipation can also be produced by means of a heater winding in heat transfer relationship with one of the legs of a U-shaped pulsating thermal relay having polymetallic legs which are of equal length. More particularly, such a heater winding can be wound on one of the equal length polymetallic legs and electrically connected across the secondary winding of the transformer 66. (This connection could be made in a manner similar to the manner of connecting the winding on leg 42 and numbered 98.) Such a heater winding is proportioned to cause a differential in temperature between the equal length polymetallic legs of such a thermal relay sufficient to cause a contact opening deflection of the freely movable end of a polymetallic leg carrying one of a pair of low energy contacts such as the contacts 36, 38.

This electroresponsive arrangement for providing anticipation of a predetermined temperature at which a hydraulic responder will interrupt heat input into an oven cavity or the like is an improvement over prior purely hydraulic temperature control systems. In certain hydraulic temperature control systems of the prior art, such anticipation was produced by a technique of exposing the hydraulic temperature senser to a predetermined amount of the radiant heat from a heating element. Such a technique is obviously subject to considerable variations depending upon varying conditions in the environment whose temperature is being sensed.

Another aspect of the present invention is in the fact that the heat output from the electrical heater 16 can be controlled independently of the hydraulic portion of the system by means of the clock control 78. Prior hydraulic temperature controls incorporating such clock controls included the clock control contacts in a high voltage circuit. Such an arrangement has been found to be unsatisfactory due to the inherent problems of interrupting a high energy circuit. In the improved arrangement the contacts 74, 76 of the clock control 78 are incorporated in the conductor 72 of the low energy circuit between the thermal relay 40 and the low energy output device 14. The clock contacts 74, 76, therefore, operate at a relatively low energy to control the operation of the low energy output device 14 independently of the hydraulic responder means or Bourdon tube 24 when a predetermined period of time has elapsed.

As a further feature of the present invention, a combination of a hydraulic temperature senser, hydraulic responder, and a pair of low energy contacts allows the low energy output device 14 to be controlled by means of a roast control arrangement 91. In the illustrated arrangement such a roast control comprises a temperature senser 92 having an electrical characteristic which varies with temperature and which is electrically connected in the low energy circuit. The senser 92 is connected to a switch 95 by means of a first conductor 94, the other side of the switch 95 being connected to the conductor 82. The other side of the senser 92 is connected to a second conductor 96 which is electrically connected through a heater winding 98, to the longest leg of the pulsating thermal relay 40. More particularly, the heater winding 98 is wound in heat transfer relationship with the first polymetallic leg 42 and having one end thereof soldered thereto. Accordingly, current will pass through the temperature senser 92 and through the winding 98 which differentially heats the first polymetallic leg 42 to cause the contacts 36, 38 to separate.

In the present arrangement the senser 92 is a thermistor having a negative temperature coefficient of resistance which is connected in series with the heater winding 98 and across the secondary winding 68. Such an arrangement produces a low current flow through the heater winding 98 at low sensed temperatures due to the relatively high resistance of senser 92 and high current flow through the heater winding 98 as the sensed temperature rises due to the lowering of the resistance as the temperature increases. Such a roast control senser may take the form, for example, of the senser illustrated in the U.S. Patent No. 2,980,875 issued on Apr. 18, 1961 to E. E. Sivacek for Thermo-Responsive Device and Method of Manufacture Thereof. Such a senser is adapted to be inserted in heat transfer relationship with an object which is heated in the oven cavity such as a roast. As the interior of the roast is heated, the heater winding 98 will draw a greater current, thus heating the leg 42 at a higher rate. Thus, the joint effect of the senser 18 and thermistor 92 will lower the temperature in the cavity to a preselected low temperature. The thermistor 92 is variable to selectively vary the preselected low temperature to correspond to the conventional degrees of doneness, such as rare, medium or well done.

In operation, the roast is initially placed in the oven with the cavity at a relatively low temperature. Accordingly, the effect of the heater winding 98 on the thermal relay 40 is negligible and the oven temperature is under the control of the hydraulic responder. The responder will cause the temperature to rise and will maintain such temperature substantially at the predetermined temperature set by the knob 54. However, as the interior temperature of the roast increases the current flow through the heater winding 98 also increases to raise the temperature of the first polymetallic leg 42. This rise in temperature will cause the second contact 38 to separate from the first contact 36 to interrupt the current supplied to the wire 84 for a predetermined period of time in a manner similar to the interruption by the self-heating of legs 42, 44. The heater winding 98 can be so proportioned to cause the contacts 36, 38 to pulse at any predetermined rate so as to continually interrupt the heat input into the hot wire and thereby maintain the temperature of the oven cavity at a temperature level lower than the predetermined temperature set by the lever 54 once the roast has reached a desired degree of doneness. It is to be noted that the circuit parameters could be so chosen as to allow the connection of switch 95 to conductor 70 thereby placing senser 92 directly across member 34 and contacts 36, 38 to shunt the current through the contacts.

In purely hydraulic temperature control systems such roast control is produced by means including a heater winding in heat transfer relationship with a hydraulic senser element such as senser 18. In such cases considerable electrical power is required to operate the roast control arrangement, namely, in the order of 21 watts. The roast control arrangement of the present invention materially reduces such power consumption. For example, approximately 1 to 10 watts of electrical power will operate the roast control bias winding, pulsating thermal relay and hydraulic control combination of the present invention.

Figure 2:
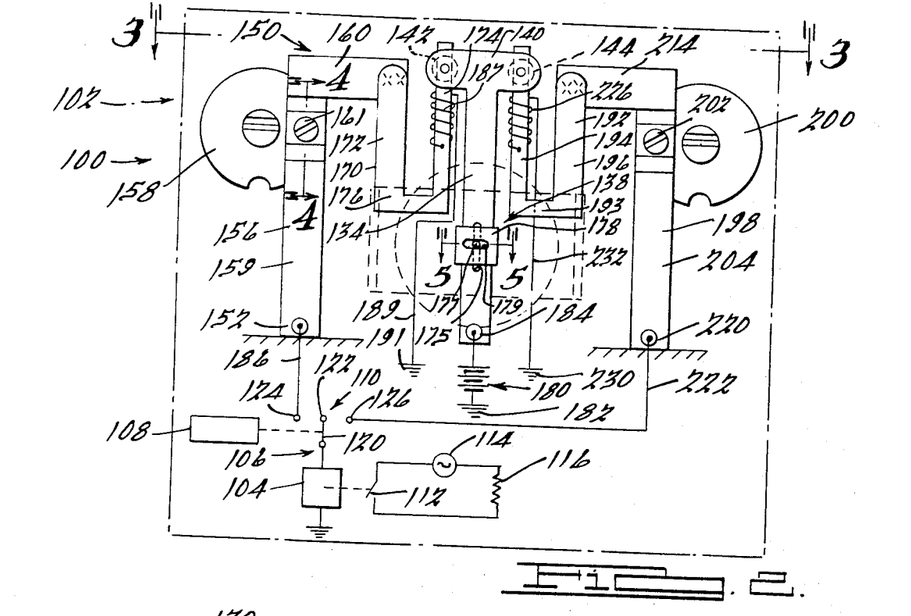
FIG. 2 is a schematic diagram of another embodiment of the present invention.
Figure 3:
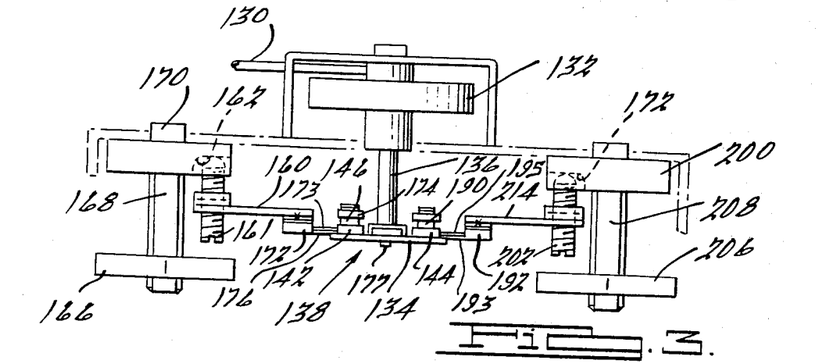
FIG. 3 is a sectional view of the embodiment of FIG. 2 taken along lines 3—3 thereof.

Referring now to FIGS. 2 to 5 of the drawings, there is illustrated another embodiment of a switch assembly 100 incorporating the above and certain other principles of the present invention. The switch assembly 100 generally comprises a temperature responsive switch 102 which controls an output device 104 through a mode selector means 106, such as a clock device 108 and switch means 110, as illustrated in FIG. 2. The output device 104 is connected to a switch 112 by some mechanical linkage or other type of connection, which is in series circuit with a source of 230 volt alternating current supply 114 feeding a heater element 116 or load. The switch 112 is adapted to selectively feed electrical energy to the heater element 116 thereby controlling the heat supply to a surface unit of a range or the cavity of an oven, although the invention is not so limited.

The switch 112 comprises a movable pole member 120 which is adapted to be moved from an off position wherein the pole 120 is in electrical connection with a contact 122, to a first selected temperature position wherein the pole 120 is in electrical connection with a contact 124, to a position corresponding to a second selected temperature wherein the pole 120 is in contact with a third contact 126. The pole 120 may be manually moved between the various positions of the switch 112 or the clock means 108 may be set to provide a preselected timed sequence of operations between contacts 122, 124 and 126. Thus the pole 120 may be timed to remain at the contact 122 for preselected period and switch to contact 124 for second preselected period, and then switch to contact 126 for a third preselected period or until such time as the pole 120 is manually actuated back into position on contact 122.

Figure 1:
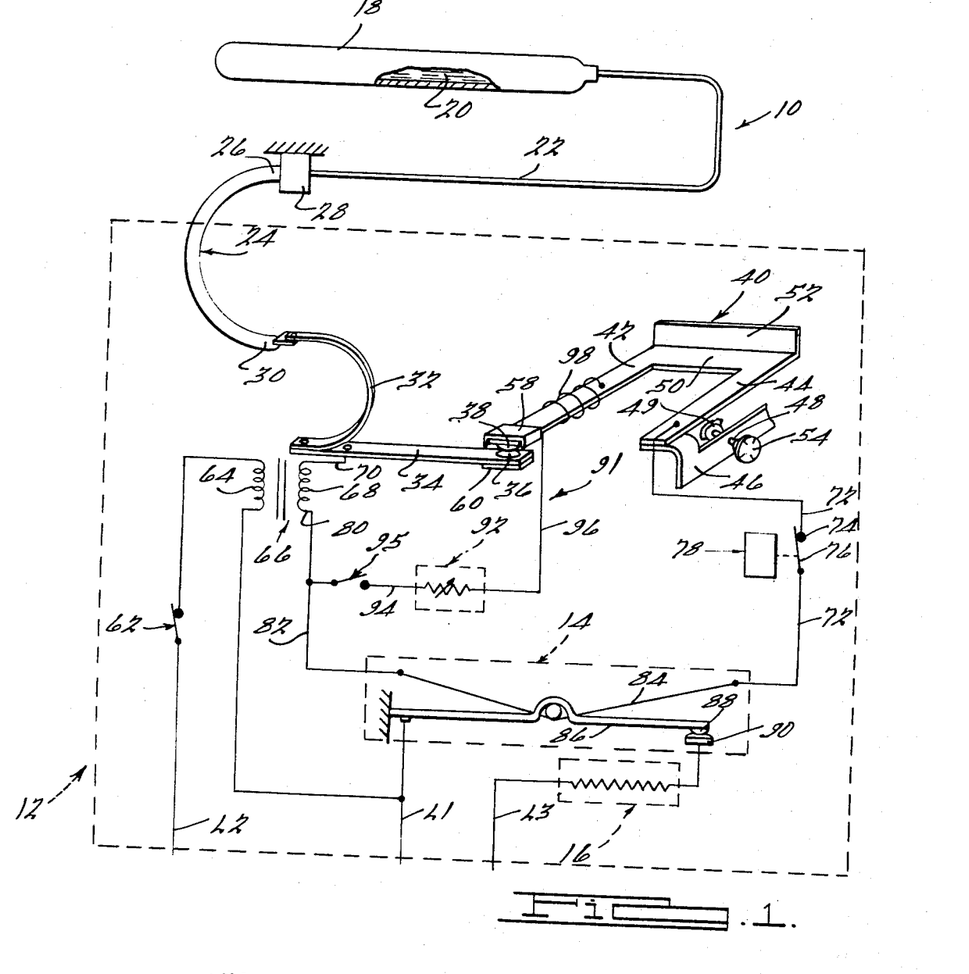
FIGURE 1 is a schematic diagram of one embodiment of the present invention.

The switch 102 is capable of delivering two separate outputs to contacts 124 and 126, respectively, through the unique arrangement of element therein to be described. The input to the switch assembly is provided through a hydraulic senser means 130, partially shown in FIG. 3, which includes a bulb or other device (not shown) which is in heat transfer relation to the mass or environment to be controlled. The senser means 130 contains an expansible fluid which expands in response to a rise in temperature and is adapted to produce a hydraulic signal on a hydraulic responder means 132 which is in fluid communication therewith. The hydraulic responder means 132 is representatively illustrated as a bellows type device but it is to be understood that it could be of the Bourdon tube device illustrated in FIG. 1 or any other known type of senser or responder combination other than the hydraulic type illustrated.

The output of the hydraulic responder means 132 is adapted to be fed to a T-boom element 134 through a shaft assembly 136 which is interconnected therebetween. The connection is made through an adjustable connector means 138 which interconnects with the T-boom assembly 134 at such point as to achieve a mechanical advantage, that is, for a given hydraulic force a large movement of an outer, freely movable end 140 of the T-boom 134 is achieved.

The other end of the T-boom 134 is suitably fixed to the housing (not shown) to provide a cantilevered effect thereto. The outer end 140 is adapted to control and support a pair of contact elements 142, 144, the position of which is related to the hydraulic temperature senser 130 through the action of the hydraulic responder means 132. For simplicity purposes, the side containing contact 142 will be explained first, with the other side containing contact 144 to be hereinafter explained.

The contact 142 is adapted to be matable with a contact 146 which has been mounted on an adjustable temperature selective means 150 which has been suitably fixed at one end 152 thereof to the housing. The adjustable temperature selective means 150 comprises a generally L-shaped bar member 156 which is formed of a main body member 159 extending generally parallel to the T-boom and an end member 160 connected at right angles, and generally in the same plane to member 159. The position of the bar member 156 relative to a plane through the flat portion of the T-boom is controlled by an adjustable cam wheel 158 through an adjustable screw member 161 which is threadedly received in a portion of the body member 159.

Figure 4:
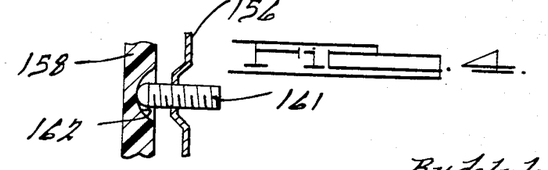
FIG. 4 is a sectional view of the embodiment of FIG. 2 taken along lines 4—4 thereof and illustrating the temperature setting mechanism.

As specifically illustrated in FIG. 4, the screw member 161 rides in an inclined camming surface 162 and as the adjustable cam member 158 is rotated by means of a knob member 166 on the end of a shaft 168 attached thereto, the lower portion of the screw member 161 is raised or lowered depending on its position relative to the camming surface 162. The knob member 166 is attached to the shaft 168 by means of a fastener 170 and the knob 166 may be suitably calibrated in degrees or be provided with an index which is adapted to be matable with a temperature scale mounted on the housing member or the range. Thus the knob provides an indication of the preselected temperature which is desired to be achieved. Also, the rotary motion of cam member 158 is translated into a linear motion of the end member 160 by means of the linkage comprising threaded member 161 and main body member 159.

While the matable contact 146 may be mounted directly on end member 160, a generally U-shaped bimetal portion 170 has been mounted at one end of end member 160 with a short leg portion 172 connected thereto and a longer leg portion 174 spaced therefrom. The two leg members 172, 174 are spaced by a generally rigid end portion 176 which may be made rigid by a flange member 173 formed thereon which is generally perpendicular to the surface of the leg members 172, 174 as in the previous embodiment.

Figure 5:
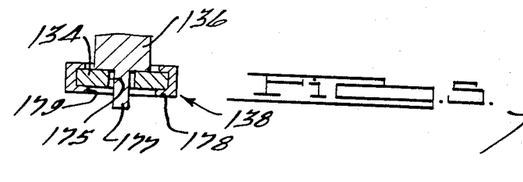
FIG. 5 is a sectional view of the embodiment of FIG. 2 taken along lines 5—5 thereof illustrating the adjustability of the mechanical advantage linkage.

The adjustable linkage is specifically illustrated in FIG. 5 and comprises a slot 175 formed in T-boom 134 and longitudinal thereof, which is adapted to receive a pin extension 177 of connector 136. Thus, the pin 177 may be axially slidable of T-boom 134 to vary the moment arm between the fixed end of the T-boom and the point of application of the responder signal. A lock member 178 having a slot 179 formed therein in a direction transverse to slot 175 is positioned in receiving engagement with the pin 177, thereby limiting the longitudinal movement thereof in slot 175. The lock member 178 is formed with a pair of overlapping flanges 181, 183 which are adapted to underlie a portion of the underside of T-boom 134. The flanges 181, 183 are illustrated as frictionally engaging the T-boom 134 but any suitable locking engagement between member 178 and T-boom 134 may be provided.

A suitable source of direct current electrical energy 180 has been provided for the switch assembly 100 with one end thereof suitably grounded at 182 and the other end connected to one end of the T-boom, as at 184. The T-boom is formed of electrically conductive material, thus providing a conductive path for the electricity to contact element 142 and 144. The bimetallic element 170 and bar member 156 are also suitably fabricated of electrically conductive material and the lower end 152 is formed with a connection through a conductor 186 to contact element 124 of switch 110. Thus the current flowing in the electrical circuit from the supply 180 to the output device 104 through contact 124 and pole member 120 is controlled through the action of T-boom assembly 134. The action between contacts 142 and 144 has been provided with the snap acting features described above and thus a suitable magnet has been provided on the end 140 of T-boom member 134 with an armature provided on leg 174 of the bimetallic element 170.

The bimetallic element 170 has been provided to allow the heater winding 187 to anticipate the achievement of the opening temperature of the unit and also to provide a pulsing opening and closing of the contacts. It is to be noted that the bar member 156 is spring biased in a downward direction thereby urging it against the adjustable cam member 158 to provide a suitable biasing force for the cam member 158.

In operation as the hydraulic responder expands in response to a signal supplied to it by sensor 130, the shaft member 136 is moved downwardly (see FIG. 3) against the action of T-boom member 134 thus forcing the member 134 downwardly in a direction away from bimetal leg 174. In this way contacts 142, 144 are forced to open, thereby breaking the low energy circuit between electrical supply 180 and output device 104. As current flows through the circuit prior to the opening of the contacts 142, 144, the longer leg 174 of bimetal member 170 differentially heats with respect to the shorter leg 172, thereby moving the end of leg 174 upwardly due to the difference in the displacement of the legs 172, 174. Thus a compensation of the action of the magnetic snap acting feature is achieved. Also, the longer leg 174 has been provided with an anticipator winding 187 which is electrically connected at one end to source 180 through a conductor 189 grounded at 191. The other end of winding 187 may be soldered as illustrated or otherwise electrically connected to leg 174 and provides means to prevent overshooting as the desired temperature is achieved. The operation is substantially identical to that described in connection with the description of FIG. 1.

The other side of the upper end 140 of T-boom member 134 is provided the contact element 144 which is adapted to be mated with a further contact 190 mounted on a second bimental member 192, as described above. The bimetal member 192 is provided with a long leg 194 and a short leg 196 to provide a differential heating of the member 192 when current is flowing therein. The two leg members are connected by a member 193 which has been stiffened by an upstanding flange member 195, as described above. A second bar member 198 is suitably controlled by an adjustable cam member 200 which coacts with a screw thread member 202 threadably engaged with a main body portion 204 of bar member 198. The adjustable cam member 200 is provided with an indexed knob 206 which is rigidly fastened thereto by a shaft 208, one end of which is fixed to the adjustable cam member 200. In this way a second temperature may be set to pre-bias contact element 190 against contact element 144 as in the above situation. The threaded member 202 slidably engages a camming surface 212 which is suitably inclined to adjustably translate the rotary motion of cam member 200 to a linear motion of end of member 214.

The circuit from the electrical supply source 180 to contact 126 is provided through the T-boom member 134, contact elements 144, 190, bimetallic element 192 and bar member 198, to a contact 220 which has been provided on one end of bar member 198. A conductor 222 suitably interconects contact 220 with contact element 126 to complete the circuit between electrical energy source 180 and contact element 126. Thus, as the pole member 120 is moved to a position in contact with contact element 126, the output device 104 is placed in circuit with the controlling contact elements 144 and 190 and is controlled thereby. In this way the plurality of preselected temperature is achieved which may be suitably timed as by the mode selector means or clock 108. The longer leg 194 of bimental 192 has been provided with an anticipator winding 226 which is soldered to leg 194 at 228 and connected to ground 230 by means of a conductor 232. The purpose and operation of winding 226 is identical to that of winding 187.

Thus, the circuit between contact element 124 and source 180, and between contact 126 and source 180 may provide a pair of modes of operation which achieves a high temperature, as in the normal cooking temperature range, and in the normal warming range to maintain the mass or environment at preselected lower temperature, as for example in maintaining a roast in a rare, medium or well done condition. Also, the arrangement described utilizes a low energy circuit to control a high energy circuit to achieve the objects enumerated hereinabove.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A hydraulic switch assembly comprising; hydraulic sensor means adapted to be mounted in condition sensing relationship with an environment, hydraulic responder means operatively controlled by said hydraulic senser means, a low energy source of power, a low energy output device, a pair of electrical contacts operatively controlled by said hydraulic responder means for controlling said low energy output device, means for setting a predetermined sensed environment condition at which said hydraulic responder means will open said contacts, a condition senser having a high temperature coefficient of resistance adapted to be inserted in sensing relationship with a mass, means for electrically connecting said condition senser to said low energy source of power, and control means operatively connected to said pair of electrical contacts and said high temperature coefficient senser for controlling said pair of contacts in response to variations in the mass condition independently of the control of said hydraulic responder means.

2. A hydraulic switch assembly comprising; hydraulic senser means adapted to be mounted in condition sensing relationship with an environment, hydraulic responder means operatively connected to said hydraulic senser means, a low energy source of power, a low energy output device, a pair of electrical contacts operatively controlled by said hydraulic responder means for controlling said low energy output device, means for establishing a predetermined sensed environment condition at which said hydraulic responder means will open said contacts, a condition senser having a high temperature coefficient of resistance adapted to be inserted in condition sensing relationship with a mass, means for electrically connecting said condition senser to said low energy source of power, thermal relay means including a polymetallic leg having a freely movable end carrying one of said pair of electrical contacts, an anticipator winding wound in controlling relationship with said polymetallic leg and operatively connected to said high temperature coefficient condition senser for controlling said pair of electrical contacts in response to variations in the mass condition independently of the control of said hydraulic responder means.

3. A hydraulic switch assembly comprising; hydraulic sensor means adapted to be mounted in condition sensing relationship with an environment, hydraulic responder means operatively controlled by said hydraulic senser means, a low energy source of power, a low energy output device, a pair of electrical contacts operatively controlled by said hydraulic responder means for controlling said low energy output device, means for establishing a predetermined sensed environment condition at which said hydraulic responder means will open said contacts, means for anticipating said predetermined sensed condition including relay means having a polymetallic leg with a freely movable end carrying one of said pair of electrical contacts to control said contacts independently of said hydraulic responder at conditions below said predetermined sensed condition, a condition senser having a high temperature coefficient of resistance adapted to be inserted in condition sensing relationship with a mass, means for electrically connecting said condition senser to said low energy source of power, an anticipator winding wound in controlling relationship with said polymetallic leg and operatively connected to said high temperature coefficient condition senser for controlling said pair of electrical contacts in response to variations in the mass condition independently of the control of said hydraulic responder means.

4. A hydraulic switch assembly comprising; hydraulic senser means for sensing a condition of an environment, hydraulic responder means operatively controlled by said hydraulic senser means including a Bourdon tube having a freely movable end, rigid conductor means connected to said freely movable end of said Bourdon tube, a low energy source of power, a low energy output device, and a relay having a pair of polymetallic legs located in spaced parallelism and connected at one end by means of a rigid crosspiece, a pair of electrical contacts, one of said contacts being mounted on one of said polymetallic legs and the other of said contacts being operatively controlled by said freely movable end of said Bourdon tube and said rigid conductor means for controlling said low energy output device in response to variations in the condition of said hydraulic senser means, means operatively connected to said relay for setting a predetermined sensed condition at which said pair of contacts will open, and means including said relay for controlling said pair of contacts independently of said hydraulic senser means when said sensed condition is below said predetermined sensed condition so as to anticipate said predetermined sensed condition.

5. A hydraulic switch assembly comprising; hydraulic senser means for sensing a condition of an environment, hydraulic responder means operatively controlled by said hydraulic senser means including a Bourdon tube having a freely movable end, rigid conductor means connected to said freely movable end of said Bourdon tube, a low energy source of power, a low energy output device, and a relay having a pair of polymetallic legs of unequal length located in spaced parallelism and connected at one end by means of a rigid crosspiece, a pair of electrical contacts, one of said contacts being mounted on the longer of said polymetallic legs and the other of said contacts being operatively controlled by said freely movable end of said Bourdon tube and said rigid conductor means for controlling said low energy output device in response to variations in the condition of said hydraulic senser means, means operatively connected to said thermal relay for setting a predetermined sensed condition at which said pair of contacts will open, and means including said thermal relay for controlling said pair of contacts independently of said hydraulic senser means when said sensed condition is below said predetermined sensed condition so as to anticipate said predetermined sensed condition.

6. A switch assembly comprising; hydraulic senser means for sensing conditions of an environment, hydraulic responder means operatively connected to said hydraulic senser means, a low energy source of power, a low energy output device and a relay for controlling the condition of said output device, said relay including a plurality of pairs of electrical contacts controlled by said hydraulic responder means, means for establishing a first predetermined environmental condition at which said responder means will open one of said pairs of contacts, means for establishing a second predetermined environmental condition at which said responder means will open another pair of contacts, and means responsive to the occurrence of a preselected event for selectively controlling said relay according to one of said first and second preselected conditions.

7. A switch assembly comprising; hydraulic senser means for sensing conditions of an environment, hydraulic responder means operatively connected to said hydraulic senser means, a low energy source of power, a low energy output device and a relay for controlling the condition of said output device, said relay including a plurality of pairs of electrical contacts controlled by said hydraulic responder means, positioning means for establishing a predetermined gap between one of said pairs of contacts and establishing a first predetermined environmental condition at which said responder means will open said one of said pairs of contacts, positioning means for establishing a predetermined gap between another of said pairs of contacts and establishing a second predetermined environmental condition at which said responder means will open said another pair of contacts, and means responsive to the occurrence of a preselected event for selectively controlling said relay according to one of said first and second preselected conditions.

8. A switch assembly comprising; hydraulic senser means for sensing conditions of an environment, hydraulic responder means operatively connected to said hydraulic senser means, a low energy source of power, a low energy output device and a relay for controlling the condition of said output device, said relay including a plurality of pairs of electrical contacts controlled by said hydraulic responder means, means supporting one contact of one of said pairs of contacts including means for establishing a first predetermined environmental condition at which said responder means will open said one of said pairs of contacts, means supporting another contact of another of said pairs of contacts including means for establishing a second predetermined environmental condition at which responder means will open another pair of contacts, and switching means responsive to the occurrence of a preselected event for selectively controlling said relay according to one of said first and second preselected conditions.

9. A switch assembly comprising; hydraulic senser means for sensing conditions of an environment, hydraulic responder means operatively connected to said hydraulic senser means, a low energy source of power, a low energy output device and a relay for controlling the condition of said output device, said relay including a first and second pair of electrical contacts controlled by said hydraulic responder means, means controlling the position of one contact of each of said first and second pair of contacts and responsive to said hydraulic responder means, means including means controlling the other contact of said first pair of contacts for establishing a first predetermined environmental condition at which said responder means will open said first pair of contacts, means including means controlling the other contact of said second pair of contacts for establishing a second predetermined environmental condition at which said responder means will open said second pair of contacts, and means responsive to the occurrence of a preselected event for selectively controlling said relay according to one of said first and second preselected conditions.

10. A switch assembly comprising; hydraulic senser means for sensing conditions of an environment, hydraulic responder means operatively connected to said hydraulic senser means, a low energy source of power, a low energy output device and a relay for controlling the condition of said output device, said relay including a first and second pair of electrical contacts controlled by said hydraulic responder means, means operatively connected to said hydraulic responder means having a fixed end and a freely movable end for controlling the position of one contact of each of said first and second pair of contacts and responsive to said hydraulic responder means, means including adjustable means controlling the position of the other contact of said first pair of contacts for establishing a first predetermined environmental condition at which said responder means will open said first pair of contacts, means including adjustable means controlling the position of the other contact of said second pair of contacts for establishing a second predetermined environmental condition at which said responder means will open said second pair of contacts, and means responsive to the occurrence of a preselected event for selectively controlling said relay according to one of said first and second preselected conditions.

11. A switch assembly comprising; hydraulic senser means for sensing conditions of an environment, hydraulic responder means operatively connected to said hydraulic senser means, a low energy source of power, a low energy output device and a relay for controlling the condition of said output device, said relay including a first and second pair of electrical contacts controlled by said hydraulic responder means, T-boom means operatively connected to said hydraulic responder means having a fixed end and a freely movable end for controlling the position of one contact of each of said first and second pair of contacts and responsive to said hydraulic responder means, bimetallic arm means including adjustable means controlling the other contact of said first pair of contacts for establishing a first predetermined environmental condition at which said responder means will open said first pair of contacts, and bimetallic arm means including adjustable means controlling the other contact of said second pair of contacts for establishing a second predetermined environmental condition at which said responder means will open said second pair of contacts.

12. A switch assembly comprising; hydraulic senser means for sensing conditions of an environment, hydraulic responder means operatively connected to said hydraulic senser means, a low energy source of power, a low energy output device and a relay for controlling the condition of said output device, said relay including a first and second pair of electrical contacts controlled by said hydraulic responder means, T-boom means operatively connected to said hydraulic responder means having a fixed end and a freely movable end for controlling the position of one contact of each of said first and second pair of contacts and responsive to said hydraulic responder means, bimetallic arm means including adjustable means controlling the other contact of said first pair of contacts for establishing a first predetermined environmental condition at which said responder means will open said first pair of contacts, bimetallic arm means including adjustable means controlling the other contact of said second pair of contacts for establishing a second predetermined environmental condition at which said responder means will open said second pair of contacts, and clock control means responsive to the occurrence of a preselected event including a switch means for selectively switching said relay means under the control of one of said first and second pair of contacts for controlling said relay according to one of said first and second preselected conditions.

13. A switch assembly comprising; hydraulic senser means for sensing conditions of an environment, hydraulic responder means operatively connected to said hydraulic senser means, a low energy source of power, a low energy output device and a relay for controlling the condition of said output device, said relay including a first and second pair of electrical contacts controlled by said hydraulic responder means, T-boom means operatively connected to said hydraulic responder means having a fixed end and a freely movable end for controlling the position of one contact of each of said first and second pair of contacts and responsive to said hydraulic responder means, bimetallic arm means including adjustable means controlling the other contact of said first pair of contacts for establishing a first predetermined environmental condition at which said responder means will open said first pair of contacts, bimetallic arm means including adjustable means controlling the other contact of said second pair of contacts for establishing a second predetermined environmental condition at which said responder means will open said second pair of contacts, means operatively associated with each of said bimetallic arm means for thermally anticipating said first and second environmental conditions, and clock control means responsive to the occurrence of a preselected event including a switch means for selectively switching said relay means under the control of one of said first and second pair of contacts for controlling said relay according to one of said first and second preselected conditions.

14. A switch assembly comprising; hydraulic senser means for sensing conditions of an environment, hydraulic responder means operatively connected to said hydraulic senser means, a low energy source of power, a low energy output device and a relay for controlling the condition of said output device, said relay including a plurality of pairs of electrical contacts controlled by said hydraulic responder means, means for establishing a first predetermined environmental condition at which said responder means will open one of said pairs of contacts, means for establishing a second predetermined environmental condition at which said resopnder means will open another pair of contacts, and switching means including a clock control means for selectively switching said relay to the control of one of said plurality of pairs of contacts in response to the occurrence of a preselected event for selectively controlling said relay according to one of said first and second preselected conditions.

15. A switch assembly comprising; hydraulic senser means for sensing conditions of an environment, hydraulic responder means operatively connected to said hydraulic senser means, a low energy source of power, a low energy output device and a relay for controlling the condition of said output device, said relay including a first electrical circuit including a first pair of electrical contacts and a second circuit including a second pair of electrical contacts controlled by said hydraulic responder means, means for establishing a first predetermined environmental condition at which said responder means will open said first pair of contacts, means for establishing a second predetermined environmental condition at which said responder means will open said second pair of contacts, and means selectively switching said relay between said first and second circuit in response to the occurrence of a preselected event for selectively controlling said relay according to one of said first and second preselected conditions.

16. A switch assembly comprising; hydraulic senser means for sensing conditions of an environment, hydraulic responder means operatively connected to said hydraulic senser means, a low energy source of power, a low energy output device and a relay for controlling the condition of said output device, said relay including a first and second pair of electrical contacts controlled by said hydraulic responder means, means controlling the position of one contact of each of said first and second pair of contacts and responsive to said hydraulic responder means, means including means controlling the other contact of said first pair of contacts for establishing a first predetermined environmental condition at which said responder means will open said first pair of contacts, means including means controlling the other contact of said second pair of contacts for establishing a second predetermined environmental condition at which said responder means will open said second pair of contacts, and switching means including a clock control means for selectively switching said relay to the control of one of said plurality of pairs of contacts in response to the occurrence of a preselected event for selectively controlling said relay according to one of said first and second preselected conditions.

17. A switch assembly comprising; hydraulic senser means for sensing conditions of an environment, hydraulic responder means operatively connected to said hydraulic senser means, a low energy source of power, a low energy output device and a relay for controlling the condition of said output device, said relay including a plurality of pairs of electrical contacts controlled by said hydraulic responder means, means supporting one contact of one of said pairs of contacts including means for establishing a first predetermined environmental condition at which said responder means will open one of said pairs of contacts, means supporting another contact of another of said pairs of contacts including means for establishing a second predetermined environmental condition at which said responder means will open another pair of contacts, and means including a clock control means for selectively switching said relay to the control of one of said plurality of pairs of contacts in response to the occurrence of a preselected event for selectively controlling said relay according to one of said first and second preselected conditions.

18. A switch assembly comprising; hydraulic senser means for sensing conditions of an environment, hydraulic responder means operatively connected to said hydraulic senser means, a low energy source of power, a low energy output device and a relay for controlling the condition of said output device, said relay including a plurality of pairs of electrical contacts controlled by said hydraulic responder means, positioning means for establishing a predetermined gap between one of said pairs of contacts and establishing a first predetermined environmental condition at which said responder means will open said one of said pairs of contacts, positioning means for establishing a predetermined gap between another of said pairs of contacts and establishing a second predetermined environmental condition at which said responder means will open said another pair of contacts, and switching means including a clock control means for selectively switching said relay to the control of one of said plurality of pairs of contacts in response to the occurrence of a preselected event for selectively controlling said relay according to one of said first and second preselected conditions.

19. An electrical switch assembly energized from a source of electrical energy comprising hydraulic sensing means for sensing the temperature of an environment, a pair of matable electric contacts, responder means operatively responsive to said sensing means for modulatingly varying the position of one of said electric contacts in accordance with the temperature sensed by said hydraulic sensing means, a polymetallic element controlling the position of one of said electric contacts, heating means energized from the source under the control of said electric contacts for heating said polymetallic element, means for establishing a predetermined sensed temperature at which said polymetallic element will open said electrical contacts, an output device controlled by said electrical contacts, and means for anticipating said predetermined temperature including means operatively connected to one of said electrical contacts for controlling said output device independently of said responder means at sensed temperatures below said predetermined sensed temperature.

20. An electrical switch assembly energized from a low-energy source of electrical energy comprising hydraulic sensing means for sensing the temperature of an environment, a pair of matable electric contacts, responder means operatively responsive to said sensing means for modulatingly varying the position of one of said electric contacts in accordance with the temperature sensed by said hydraulic sensing means a polymetallic element controlling the position of one of said electric contacts, heating means energized from the source under the control of said electric contacts for heating said polymetallic element, low-energy output device controlled by said electrical contacts, and clock control means including another pair of electrical contacts for controlling said output device independently of said responder means.

References Cited

UNITED STATES PATENTS

| | | | |
|---|---|---|---|
| 2,744,337 | 5/1956 | Raney | 200—136.3 X |
| 2,764,651 | 9/1956 | Lang | 200—140 |
| 3,023,294 | 2/1962 | Severson et al. | 317—132 X |
| 3,116,398 | 12/1963 | Welch | 219—413 |
| 3,172,998 | 3/1965 | Ferguson. | |
| 3,234,409 | 2/1966 | March et al. | 200—136.3 X |
| 3,244,841 | 4/1966 | Gardes et al. | 200—136.3 |
| 3,302,001 | 1/1967 | Frazier | 236—46 X |

ROBERT K. SCHAEFER, *Primary Examiner.*

T. B. JOIKE, *Assistant Examiner.*